United States Patent
Bendi et al.

(10) Patent No.: US 10,063,506 B2
(45) Date of Patent: Aug. 28, 2018

(54) PREVENTING SMS MESSAGE FORWARDING LOOPS

(71) Applicant: Cellco Partnership, Arlington, VA (US)

(72) Inventors: Sethumadhav Bendi, Walnut Creek, CA (US); Bradley D. Cooper, Orchard Lake, MI (US); Jerry M. Kupsh, Concord, CA (US); Kumar Sanjeev, San Ramon, CA (US); Amir Mayblum, Walnut Creek, CA (US); Zhijian Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 907 days.

(21) Appl. No.: 13/864,909

(22) Filed: Apr. 17, 2013

(65) Prior Publication Data

US 2014/0317198 A1    Oct. 23, 2014

(51) Int. Cl.
*G06F 15/16*    (2006.01)
*H04L 12/58*    (2006.01)

(52) U.S. Cl.
CPC .................................. *H04L 51/14* (2013.01)

(58) Field of Classification Search
CPC .............................. H04L 51/14; H04L 51/16
See application file for complete search history.

(56) References Cited

U.S. PATENT DOCUMENTS

| | | | | |
|---|---|---|---|---|
| 2002/0122540 A1* | 9/2002 | Yakura | ...................... | H04L 51/30 379/67.1 |
| 2005/0066005 A1* | 3/2005 | Paul | ...................... | G06Q 10/107 709/206 |
| 2009/0193089 A1* | 7/2009 | Ochi | ...................... | G06Q 10/107 709/206 |
| 2009/0327434 A1* | 12/2009 | Reynolds | ............... | G06Q 30/02 709/206 |

(Continued)

FOREIGN PATENT DOCUMENTS

WO    WO 2012100820 A1 *    8/2012    .........    H04L 12/5855

OTHER PUBLICATIONS

3rd Generation Partnership Project 2 ("3GPP2"), "MAP Compatibility Signaling Protocols," 3GPP2 X.S0004-590-E Version 1.0.0, Mar. 2004.

*Primary Examiner* — Ryan Jakovac

(57) ABSTRACT

A device may be configured to receive a message from a user device; and determine whether the message includes a parameter. When the message does not include the loop indicator parameter, the device may add the loop indicator parameter to the message to generate a first modified message, and output the first modified message toward an intended recipient of the message. When the message includes the loop indicator parameter, the device may determine whether a value of the loop indicator parameter exceeds a threshold value. When the value of the loop indicator parameter does not exceed the threshold value, the device may discard the message. When the value of the loop (Continued)

indicator parameter exceeds the threshold value, the device may modify the value of the loop indicator parameter value to generate a second modified message, and output the second modified message toward the intended recipient of the message.

18 Claims, 13 Drawing Sheets

(56) References Cited

U.S. PATENT DOCUMENTS

| | | | |
|---|---|---|---|
| 2012/0096097 A1* | 4/2012 | Morinaga | G06Q 10/107 709/206 |
| 2014/0025756 A1* | 1/2014 | Kamens | H04L 51/066 709/206 |
| 2014/0214977 A1* | 7/2014 | Buchko | H04L 47/22 709/206 |
| 2014/0282864 A1* | 9/2014 | Thubert | H04L 63/1458 726/3 |

* cited by examiner

Feedback parameter not present in message from A; added when forwarding from B to C

PREVENTING SMS MESSAGE FORWARDING LOOPS

BACKGROUND

User devices, such as cellular telephones, may communicate using a variety of communication techniques. For example, user devices may communicate via voice, data, short message service ("SMS") messages, or other types of communication methodologies. In some situations, network providers may provide for message forwarding services, whereby a message received by one user device may be automatically forwarded to another user device.

DETAILED DESCRIPTION OF PREFERRED EMBODIMENTS

The following detailed description refers to the accompanying drawings. The same reference numbers in different drawings may identify the same or similar elements.

Some network providers may provide for message forwarding services between user devices. For example, a user device may be associated with a message forwarding service, whereby SMS messages received by the user device are forwarded to another user device. An example situation where such forwarding may occur may be a situation in which first a user, associated with one user device, wishes to forward all SMS messages received by the user device to a second user device associated with a second user.

Some situations may occur in which a closed loop system of message forwarding may occur. For instance, continuing with the above example, the second user device may also be associated with a message forwarding service, whereby SMS messages received by the second user device are forwarded to the first user device. In this scenario, the first user and the second user device may forward the same message back and forth between one another in a loop, potentially indefinitely. This may result in a poor user experience, as well as a waste of network resources.

Figure 1:
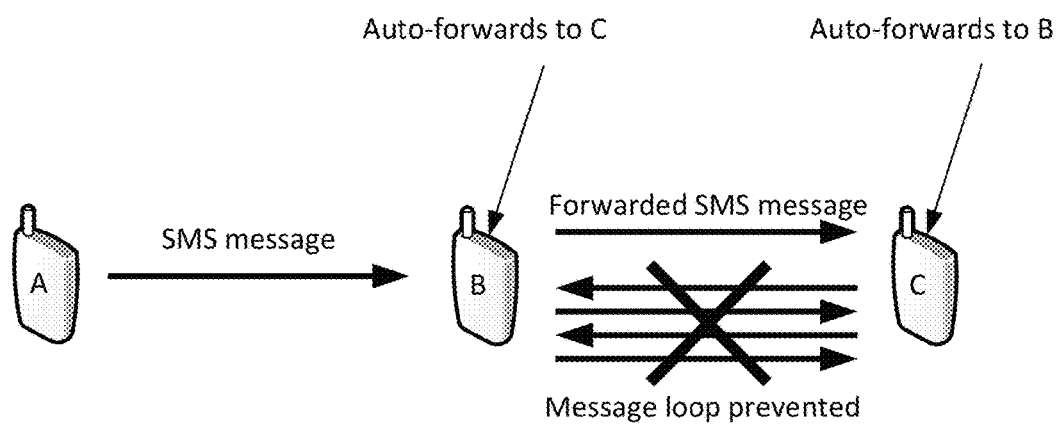
FIG. 1 illustrates an overview of one or more example implementations described herein.

Techniques described herein may allow for the prevention of such message loops. For example, as shown in FIG. 1, a first user device ("user device A") may send a SMS message to user device B. As shown in the figure, user device B may be associated with a messaging service, whereby SMS messages sent to user device B are forwarded to user device C. As shown in the figure, the SMS message may be forwarded to user device C. As described further below, a parameter may be added to the SMS message when the SMS message is forwarded to user device C from user device B. This parameter may be used when SMS to avoid a message loop (e.g., an infinite message loop). As shown in FIG. 1, based on this parameter, a message loop may be prevented, in that the same message may be prevented from being forwarded back and forth between user devices A and B. By preventing such message loops, some implementations may make message forwarding feasible, by reducing or eliminating the risk that a user's experience will be detrimentally affected by message loops, and by reducing or eliminating the risk that network resources will be unnecessarily consumed by message loops.

Figure 2:
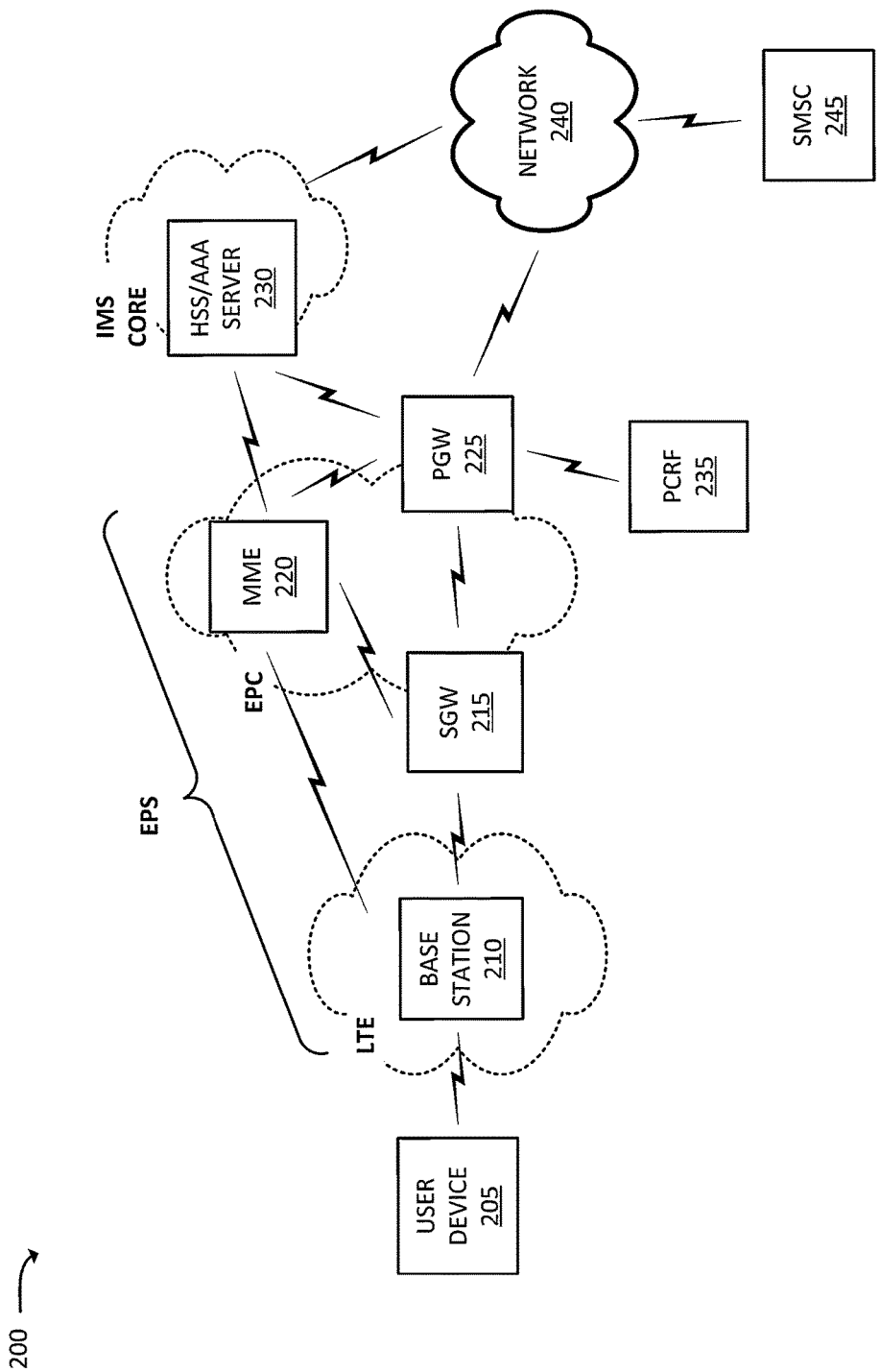
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user device 205, base station 210 (which may, in some implementations, take the form of an evolved node B ("eNB")), serving gateway ("SGW") 215, packet data network ("PDN") gateway ("PGW") 225, mobility management entity device ("MME") 220, home subscriber server ("HSS")/authentication, authorization, accounting ("AAA") server 230 (hereinafter referred to as "HSS/AAA server 230"), policy charging and rules function ("PCRF") 235, network 240, and short message service center ("SMSC") 245 (also sometimes known as a short message service-service center ("SMS-SC")).

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes a LTE network and/or an evolved packet core ("EPC") network that operate based on a third generation partnership project ("3GPP") wireless communication standard. The LTE network may be, or may include, a RAN that includes one or more base stations 210, some or all of which, may take the form of an eNB, via which user device 205 may communicate with the EPC network. The EPC network may include one or more SGWs 215, MMEs 220, and/or PGWs 225, and may enable user device 205 to communicate with network 240 and/or an Internet protocol ("IP") multimedia subsystem ("IMS") core network. The IMS core network may include HSS/AAA server 230, and may manage authentication, session initiation, account information, a user profile, etc. associated with user device 205.

User device 205 may include any computation and communication device, such as a wireless mobile communication device that is capable of communicating with base station 210 and/or network 240. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic (e.g., SMS messages) to and/or receive traffic from network 240 via base station 210, SGW 215, and/or PGW 225.

Base station 210 may include one or more network devices that receive, process, and/or transmit traffic, such as calls, audio, video, text, and/or other data, destined for and/or received from user device 205. In one example, base station 210 may be an eNB device and may be part of the LTE network. Additionally, or alternatively, one or more other base stations 210 may be associated with a RAN that is not associated with the LTE network (e.g., a wireless hot spot, a wireless access point, etc.). Base station 210 may receive traffic from and/or send traffic to network 240 via SGW 215 and PGW 225. Base station 210 may send traffic to and/or receive traffic from user device 205 via an air interface.

SGW 215 may include one or more network devices that gather, process, search, store, and/or provide information in a manner described herein. SGW 215 may, for example, aggregate traffic received from one or more base stations 210 and may send the aggregated traffic to network 240 via PGW 225.

MME 220 may include one or more computation and communication devices that perform operations to register user device 205 with the EPS, to establish bearer channels associated with a session with user device 205, to hand off user device 205 from the EPS to another network, to hand off user device 205 from the other network to the EPS, and/or to perform other operations. MME 220 may perform policing operations on traffic destined for and/or received from user device 205.

PGW 225 may include one or more network devices that gather, process, search, store, and/or provide information in a manner described herein. PGW 225 may aggregate traffic received from one or more SGWs 215, etc. and may send the aggregated traffic to network 240. PGW 225 may also, or alternatively, receive traffic from network 240 and may send the traffic toward user device 205 via SGW 215 and/or base station 210.

HSS/AAA server 230 may include one or more server devices that manage, update, and/or store, in a memory associated with HSS/AAA server 230, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 205 and/or one or more other user devices 205. Additionally, or alternatively, HSS/AAA server 230 may perform authentication, authorization, and/or accounting operations associated with the subscriber and/or a communication session with user device 205.

PCRF 235 may include one or more server devices that aggregate information to and from the EPC network and/or other sources. PCRF 235 may receive information regarding policies and/or subscriptions from one or more sources, such as subscriber databases and/or from one or more users (such as, for example, an administrator associated with PCRF 235).

Network 240 may include one or more wired and/or wireless networks. For example, network 240 may include a packet data network ("PDN"), such as an IP-based PDN. Network 240 may include, for example, a wide area network such as the Internet, or one or more other networks. User device 205 may connect, through PGW 225, to data servers, application servers, or to other servers/applications that are coupled to network 240.

SMSC 245 may include one or more server devices that serve to control the flow of SMS messages. For instance, SMSC 245 may store, forward, convert, and deliver SMS messages. SMSC 245 may receive and/or store information regarding message forwarding rules. For instance, SMSC 245 may store information indicating that SMS messages received by a particular user device 205 should be forwarded to another user device 205. As described further below, SMSC 245, in accordance with some implementations, may prevent message loops by examining and/or modifying forwarded SMS messages.

While environment 200 is described above in the context of an LTE network, in practice, other types of networks may be used. For instance, in some implementations, environment 200 may additionally, or alternatively, include a code division multiple access ("CDMA") network. Furthermore, while in some implementations described herein, SMSC 245 examines and/or modifies SMS messages to prevent message loops, in other implementations, one or more other devices may examine and/or modify SMS messages in lieu of, or in addition to, SMSC 245. For example, in some implementations, user device 205 and/or a service device may examine and/or modify SMS messages.

Figure 3:
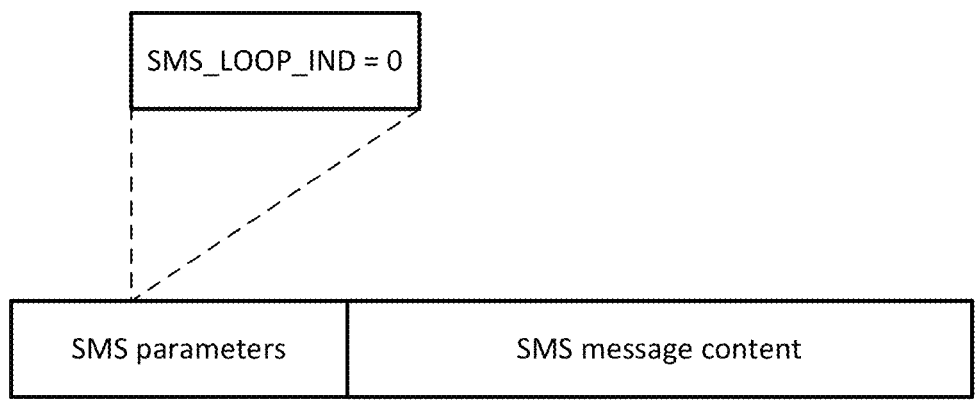
FIG. 3 illustrates an example data structure associated with a SMS message, according to some implementations described herein.

FIG. 3 illustrates an example data structure associated with a SMS message. For example, the SMS message may include message content, as well as SMS parameters. For example, these parameters may include: information identifying a sender of the SMS message (e.g., an MDN, an Internet protocol ("IP") address, an international mobile equipment identity ("IMEI"), or other identifying information) information identifying a recipient of the SMS message, information regarding a size of the SMS message, and/or other parameters. In some implementations, and as described further below, some SMS messages may include a loop indicator parameter (shown in the figure as "SMS_LOOP_IND"). As described below, this parameter may be set to a value that aids in the prevention of message loops, which may occur when user devices 205 forward SMS messages back and forth. In some implementations, the loop indicator parameter may be added to an SMS message, and/or may be modified, by a particular SMSC 245. This additional parameter may be added to the SMS message in accordance with, for example, the standard, 3GPP2 X.S0004-590-E ("MAP Compatibility Signaling Protocol").

Figure 4:
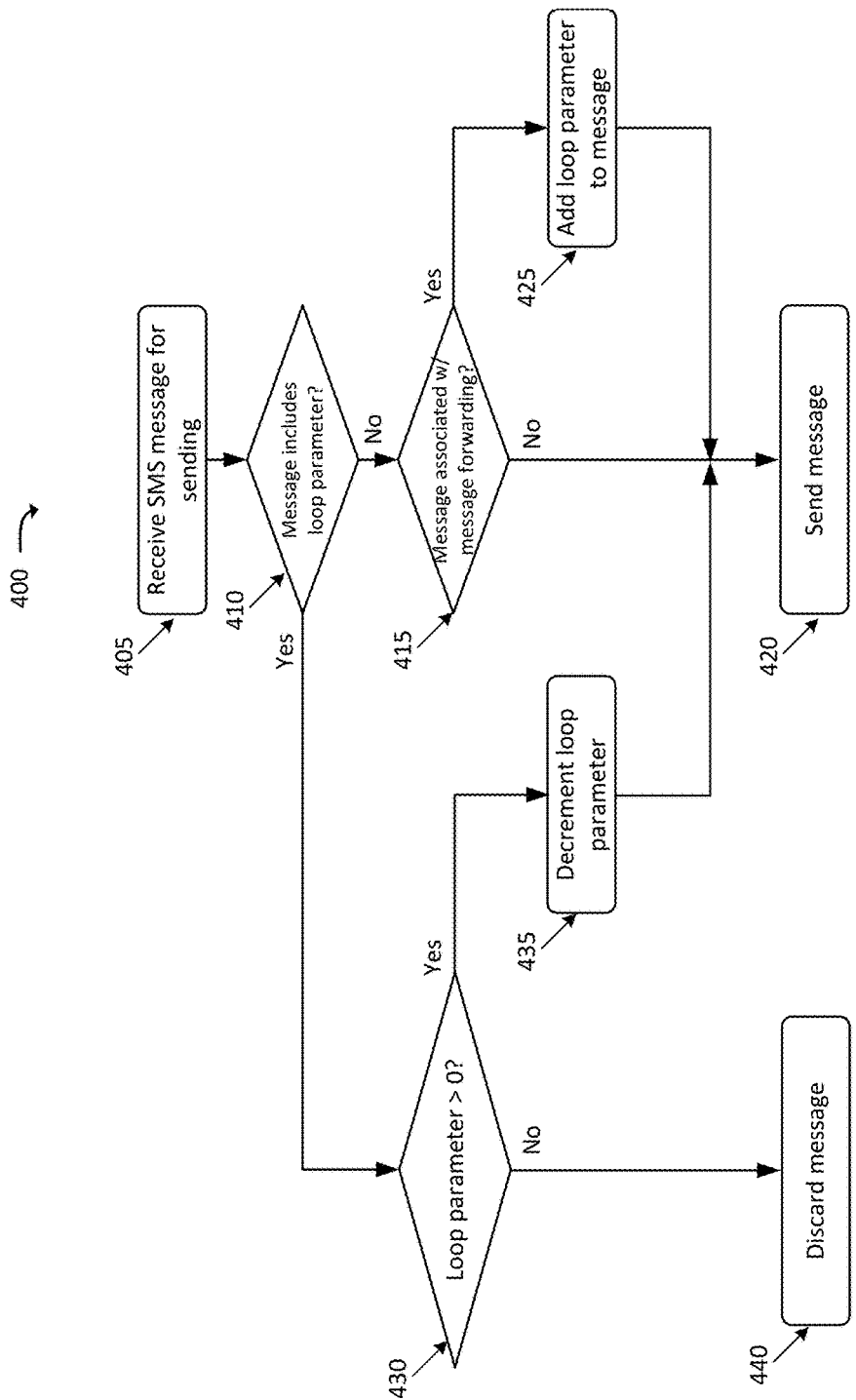
FIG. 4 illustrates an example process for preventing message feedback.

FIG. 4 illustrates an example process for preventing message feedback. In one example implementation, process 400 may be performed by SMSC 245. In other implementations, some or all of process 400 may be performed by one or more other devices in lieu of, or in conjunction with, SMSC 245. For example, in some implementations, some or all of process 400 may be performed by user device 205.

As shown, process 400 may include receiving an SMS message for sending (block 405). For example, SMSC 245 may receive an SMS message from a particular user device 205 (e.g., an SMS message that is destined for another user device 205). In some implementations, SMSC 245 may receive the SMS message, from the particular user device 205, via network 240 and/or one or more other devices. In some implementations, SMSC 245 may be a home SMSC, with respect to the particular user device 205 (e.g., a SMSC that receives and/or stores information regarding the particular user device 205, such as forwarding information associated with user device 205). In some implementations, SMSC 245 may receive the SMS message from another SMSC 245, or another device.

Process 400 may also include determining whether the message includes a loop indicator parameter (block 410). For instance, SMSC 245 may examine the message (received at block 405) to determine whether the message includes a loop indicator parameter (e.g., as conceptually shown in FIG. 3).

If the message does not include a loop indicator parameter (block 410—NO), then process 400 may include determining whether the message is associated with message forwarding (block 415). For example, SMSC 245 may examine the received message to determine a MDN associated with the sender of the message (i.e., user device 405, in this example), and may compare the MDN to information stored by SMSC 245 to determine whether user device 405 is associated with message forwarding.

If the message is not associated with message forwarding (block 415—NO), then process 400 may include sending the message (block 420). For example, SMSC 245 may proceed with sending the message to the intended recipient. In this sense, when the conditions specified in blocks 410 and 415 are not met (i.e., at block 410—NO; and at block 415—NO), SMSC 245 may be thought of as sending messages "as normal," without modifying the messages for the purposes of preventing message loops.

If, on the other hand, the message is associated with message forwarding (block 415—YES), then process 400 may include adding a loop indicator parameter to the message (block 425). For example, SMSC 245 may modify the message by adding a loop indicator parameter (e.g., SMS_LOOP_IND, as shown in FIG. 3). When adding the loop indicator parameter, SMSC 245 may set a value of the loop indicator parameter to a default value (e.g., 0, 1, 5, or another value). In some implementations, the default value may be manually set or adjusted by a user (e.g., an administrator associated with network 240 and/or SMSC 245, a user associated with user device 205, or another user). In some implementations, the default value be set or adjusted automatically (e.g., by SMSC 245 based on usage statistics or analytics). The value of the loop indicator parameter may generally indicate a maximum number of times that a particular message will be forwarded.

Further, if the message is associated with message forwarding (block 415—YES), then process 400 may additionally include sending the message (block 420). The sent message may include the loop indicator parameter added at block 425.

Returning to block 410, if the message includes a loop indicator parameter (block 410—YES), then process 400 may include determining whether the value associated with the loop indicator parameter is greater than 0 (block 430). If the loop indicator parameter is greater than 0 (block 430—YES), then process 400 may include decrementing the value associated with the loop indicator parameter (block 435). For example, SMSC 245 may modify the message by decrementing the value associated with the loop indicator parameter (e.g., decrement by 1, or by another value).

Further, if the loop indicator parameter is greater than 0 (block 430—YES), then process 400 may additionally include sending the message (block 420). The sent message may include the loop indicator parameter modified at block 435.

While blocks 430-440 are described above as one implementation of determining when to discard a message and when to modify the message, in practice, other implementations are possible. For instance, instead of determining (at block 430) whether the value is greater than 0, in some implementations, SMSC 245 may determine whether the value is greater than some other number, or whether the value is less than a particular number. Further, in some implementations, SMSC 245 may increment (at block 435) the value associated with the loop indicator parameter in lieu of decrementing the value.

If, on the other hand, the loop indicator parameter value of the received message is not greater than 0 (block 430—NO), then process 400 may include discarding the message. For instance, SMSC 245 may forgo forwarding the message to the intended recipient. In some implementations, when discarding the message, SMSC 245 may store and/or output an indication that the message was discarded. For instance, SMSC 245 may output a notification to a user device, from which the message was received (at block 405), indicating that the message was not forwarded. The user device may, in some implementations, display a notification that the message was not forwarded. Examples of user interfaces, via which user device 205 may display such a notification, are described below with respect to FIGS. 5 and 6.

While process 400 is described above as being performed by SMSC 245, some or all of process 400 may be performed by another device, such as user device 205. For instance, assume user device 205 is associated with message forwarding, and receives a message to be forwarded. User device 205 may, for example, determine that the message does not include a loop indicator parameter (block 410—NO), may add a loop message parameter (block 425), and may send (at block 420) the message. As another example, user device may determine that the message includes a loop indicator parameter (block 410—YES), determine whether the value associated with the loop indicator parameter is greater than 0 (block 430), and may discard (at block 440) or send the message (e.g., at blocks 435 and 420) accordingly.

Furthermore, in some implementations, process 400 may include additional, fewer, or different blocks. For instance, in some implementations, process 400 may not include block 415. In some such implementations, when the message does not include a loop indicator parameter (block 410—NO), process 400 may include adding the loop indicator parameter (at block 425), without determining whether the message is associated with message forwarding.

Figure 5:
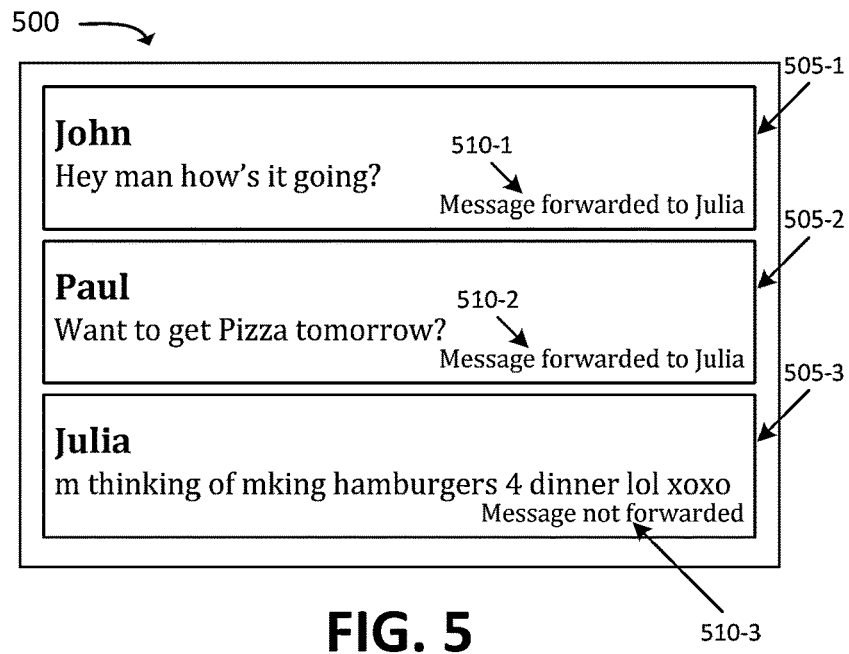
FIGS. 5 and 6 illustrate example user interfaces, associated with providing notifications that messages have or have not been forwarded.
Figure 6:
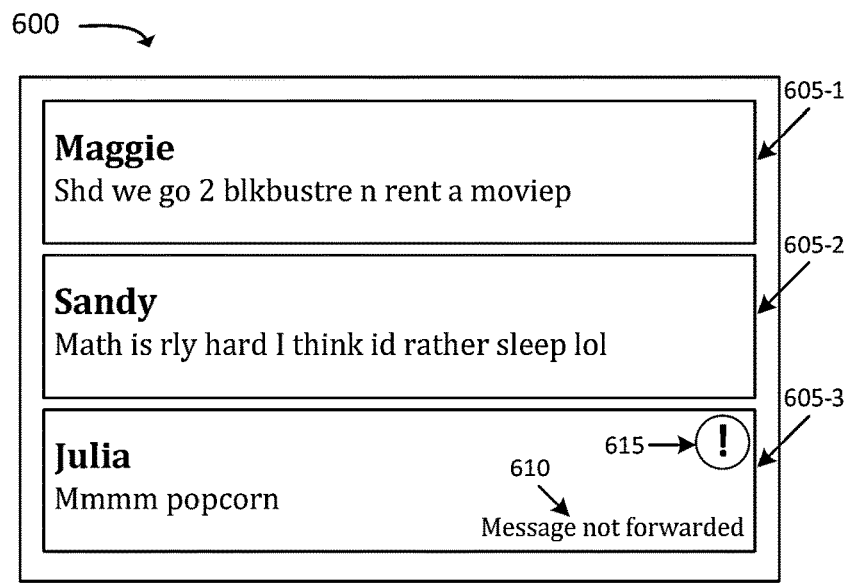

FIGS. 5 and 6 illustrate example user interfaces 500 and 600, respectively, which may be displayed by a particular user device 205 for providing notifications regarding messages that have or have not been forwarded. For instance, as shown in FIG. 5, user interface 500 may include display areas 505-1 through 505-3 (hereinafter referred to collectively as "display areas 505," or individually as "display area 505"). Each display area 505 may be associated with a text message received by user device 205. As shown, each display area 505 may include an indicator of whether the text message was forwarded (e.g., indicators 510-1 through 510-3 (hereinafter referred to collectively as "indicators 510," or individually as "indicator 510")). In some implementations, each indicator 510 may also indicate a recipient of the forwarded message.

FIG. 6 illustrates another example user interface 600, which may indicate whether messages have been forwarded. User interface 600 may include display areas 605-1 through 605-3 (hereinafter referred to collectively as "display areas 605," or individually as "display area 605"). Each display area 605 may be associated with a text message received by user device 205. As shown, display areas 605 may omit indicators indicating that a text message was forwarded (e.g., display areas 605-1 and 605-2 do not include such indicators), while including indicators when a text message was not forwarded. For example, display area 605-3 may include a textual indicator 610, a graphical indicator 615 (e.g., an exclamation point, as shown), a color indicator (e.g., display area 605-3 may be shaded differently than other display areas 605), and/or another indicator.

Figure 7:
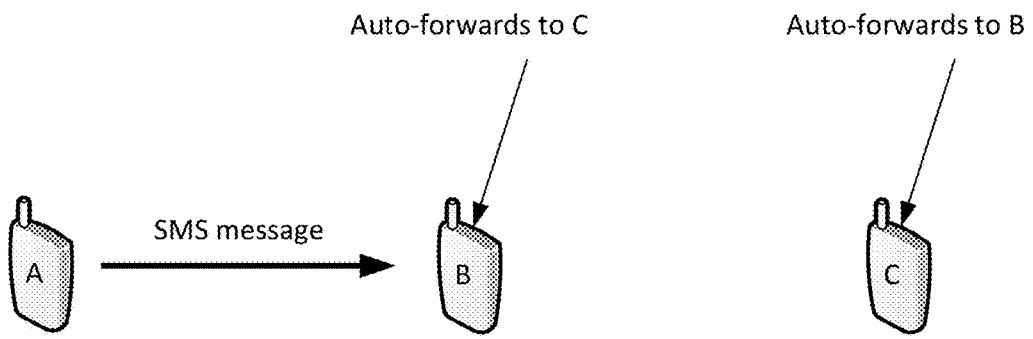
FIGS. 7-9 conceptually illustrate an example of preventing message feedback.
Figure 8:
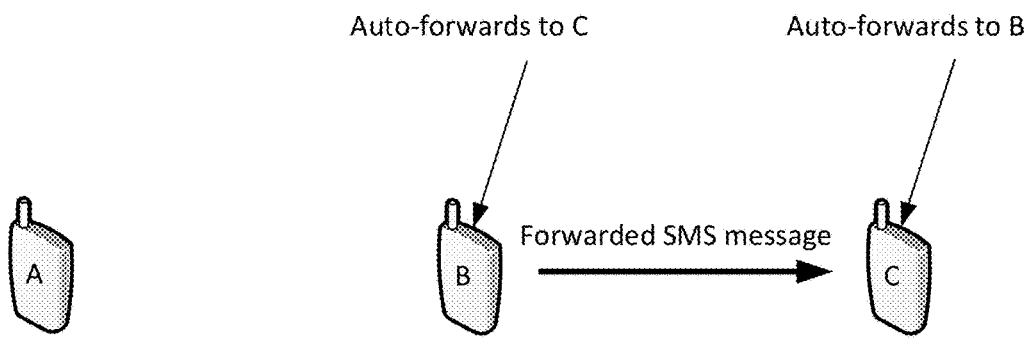
Figure 9:
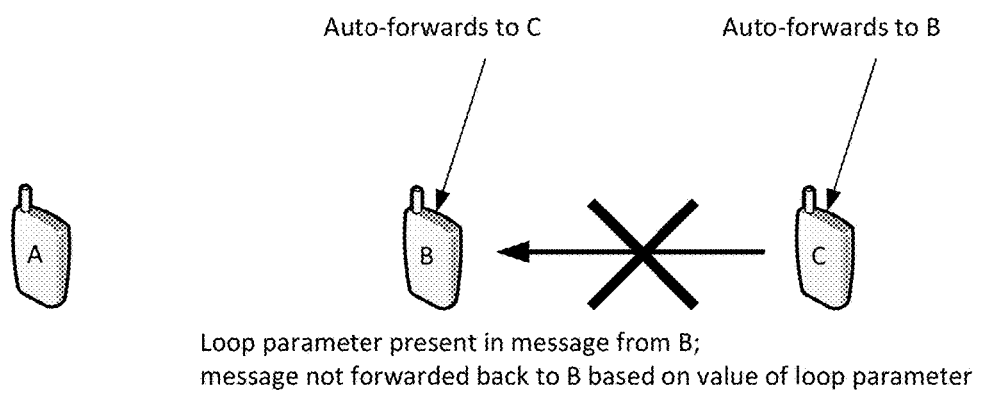

FIGS. 7-9 conceptually illustrate an example of preventing message feedback (e.g., using a process similar to process 400, shown in FIG. 4). For example, FIG. 7 illustrates that user device B is associated with a message forwarding feature, whereby user device B forwards messages to user device C, and that user device C is associated with a message forwarding feature, whereby user device C forwards messages to user device B. As shown, user device A may send a SMS message to user device B. Assume, for this example, that this SMS message does not include a loop indicator parameter.

As shown in FIG. 8, a SMSC associated with user device B may identify that the SMS message dos not include a loop indicator parameter, and may add a loop indicator parameter. Assume, for this example, that the added loop indicator parameter has a value of 0. The SMSC may forward the message toward user device C, with the added loop indicator parameter, and user device C may receive the message.

As shown in FIG. 9, a SMSC associated with user device C may receive the message for forwarding to user device B (e.g., based on forwarding rules associated with user device C). The SMSC associated with user device C may identify that the loop indicator parameter is included in the message, and that the value of the loop indicator parameter is 0. Based on the value of the loop indicator parameter, the SMSC associated with user device C may discard the message (e.g., forgo sending the message toward user device B). In this sense, a message loop may be prevented.

Figure 10:
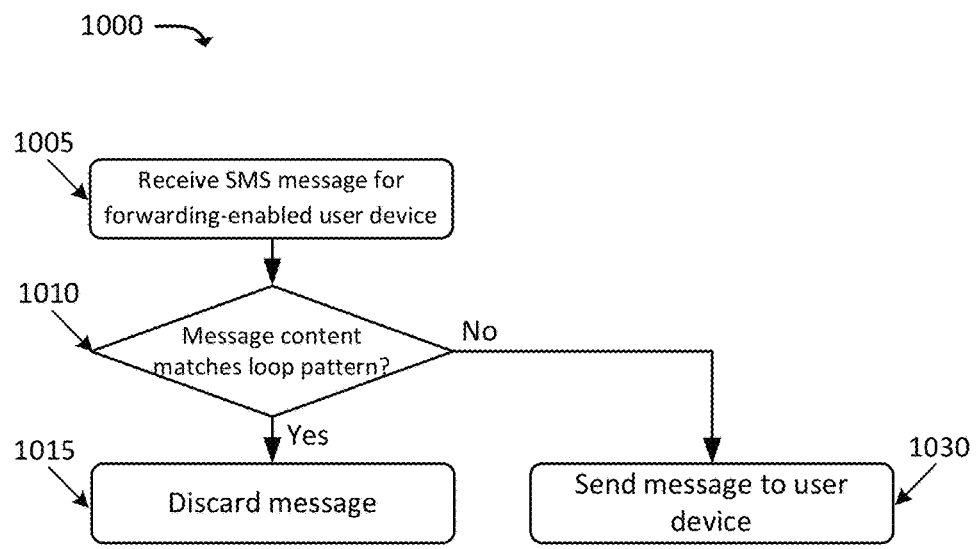
FIG. 10 illustrates an example process for preventing message feedback based on a pattern matching technique.

FIG. 10 illustrates an example process 1000 for preventing message feedback based on pattern matching. For instance, process 1000 may be used to prevent feedback between user devices associated with multiple different service providers. In one example implementation, process 1000 may be performed by SMSC 245. In other implementations, some or all of process 1000 may be performed by one or more other devices in lieu of, or in conjunction with, SMSC 245.

As shown, process 1000 may include receiving an SMS message for a forwarding-enabled user device (block 1005). For example, SMSC 245 may receive an SMS message from a sender (e.g., an SMS message that is destined for user device 205). In some implementations, SMSC 245 may receive the SMS message, from the sender, via network 240 and/or one or more other devices. In some implementations, SMSC 245 may be a home SMSC, with respect to the user device 205 (e.g., a SMSC that receives and/or stores information regarding user device 205, such as forwarding information associated with user device 205). In some implementations, SMSC 245 may receive the SMS message from another SMSC 245, or another device. For the purposes of the example implementation shown in this figure, assume that SMSC 245 stores information identifying that user device 205 is forwarding-enabled—that is, that some or all messages sent to user device 205 are to be forwarded.

Process 1000 may also include determining whether content of the message matches a particular loop pattern (block 1010). For instance, SMSC 245 may examine content of the message to determine whether the content of the message matches a pattern (e.g., a regular expression) that is associated with message loops. For example, the pattern may be specified as the regular expression "*FW*FW*FW*FW*FW*" (where "*" indicates any string of characters, including an empty string). In other words, in this example, the pattern associated with message loops may be any string that includes 5 instances of the string "FW."

In some implementations, the message (received at 1005) may be a type of message that includes a subject (e.g., an e-mail message). In some such implementations, when examining (at block 1010) the content of the message, SMSC 245 may examine a subject line of the message, and may determine whether the subject line matches the pattern associated with message loops. Additionally, or alternatively, SMSC 245 may examine a body of the message, and may determine whether the body matches the pattern associated with message loops.

If the message content matches the loop pattern (block 1010—YES), then process 1000 may include discarding the message. For instance, SMSC 245 may forgo forwarding the message to the intended recipient of the message (block 1015). In some implementations, when discarding the message, SMSC 245 may store and/or output an indication that the message was discarded. For instance, SMSC 245 may output a notification to a user device, from which the message was received (at block 1005), indicating that the message was not forwarded. The user device may, in some implementations, display a notification that the message was not forwarded. Examples of user interfaces, via which user device 205 may display such a notification, are described above with respect to FIGS. 5 and 6.

If, on the other hand, the message content does not match the loop pattern (block 1010—NO), then process 1000 may include sending the message (block 1030). For example, SMSC 245 may proceed with sending the message to the intended recipient.

Figure 11A:
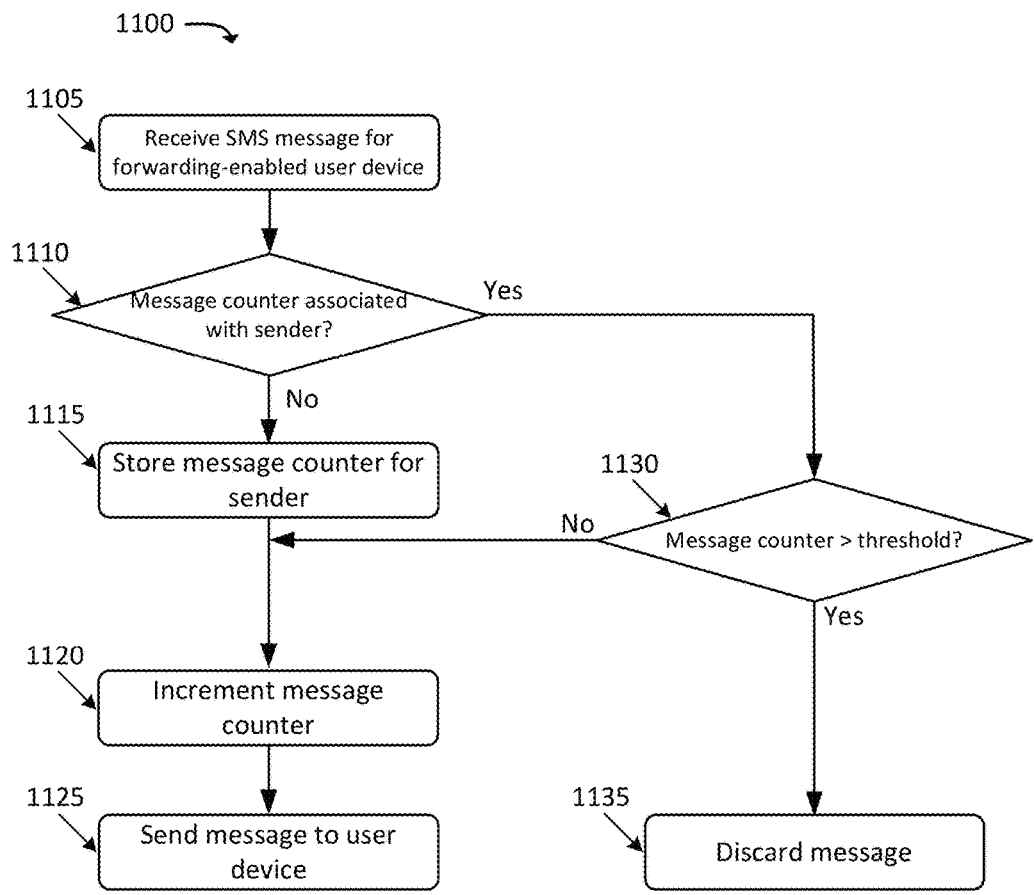
FIGS. 11A and 11B illustrate example processes for preventing message feedback based on a volume of messages received.

FIG. 11A illustrates an example process 1100 for preventing message feedback based on a volume of messages received. For instance, process 1100 may be used to prevent feedback between user devices associated with multiple different service providers. In one example implementation, process 1100 may be performed by SMSC 245. In other implementations, some or all of process 1100 may be performed by one or more other devices in lieu of, or in conjunction with, SMSC 245.

As shown, process 1100 may include receiving an SMS message for a forwarding-enabled user device (block 1105). For example, SMSC 245 may receive an SMS message from a sender (e.g., an SMS message that is destined for user device 205). In some implementations, SMSC 245 may receive the SMS message, from the sender, via network 240 and/or one or more other devices. In some implementations, SMSC 245 may be a home SMSC, with respect to the user device 205 (e.g., a SMSC that receives and/or stores information regarding user device 205, such as forwarding information associated with user device 205). In some implementations, SMSC 245 may receive the SMS message from another SMSC 245, or another device. For the purposes of the example implementation shown in this figure, assume that SMSC 245 stores information identifying that user device 205 is forwarding-enabled—that is, that some or all messages sent to user device 205 are to be forwarded.

Process 1100 may also include determining whether a message counter, associated with a sender of the message, has been stored (block 1110). For instance, SMSC 245 may determine whether SMSC 245 (and/or another device) presently maintains a message counter for messages received from the sender. The message counter may be used to track a quantity of messages received from the sender (e.g., a quantity of messages received from the sender of a particular period of time, such as within the last three seconds, within the last five seconds, or another period of time).

In some implementations, different message counters may be associated with different senders. For instance, assume that SMSC 245 receives messages from three different senders. In this situation, SMSC 245 may maintain three different message counters. For each message counter, SMSC 245 may store an identifier of the sender associated with the message counter, such as an MDN, e-mail address, and/or another identifier.

If a message counter has not been stored (block 1110—NO), then process 1100 may include storing a message counter for the sender (block 1115). In some implementations, this newly stored message counter may be set to a default value, such as zero. Process 1100 may further include incrementing the message counter (block 1120). For instance, SMSC 245 may increment the message counter by one, or another value. Process 1100 may additionally include sending the message to the user device (block 1125).

If, on the other hand, a message counter has been stored (block 1110—YES), then process 110 may include determining whether the message counter exceeds a threshold. For example, this threshold may be associated with a maximum number of allowed messages over the particular period of time, tracked by the message counter. For instance, assume that the message counter tracks the quantity of messages received over the previous five seconds, and that the threshold value is ten. This threshold may be exceeded if greater than ten messages are received from the same sender within five seconds.

If the message counter exceeds the threshold (block 1130—YES), then process 1100 may include discarding the message (block 1135). For instance, SMSC 245 may forgo forwarding the message to the intended recipient of the message. In some implementations, when discarding the message, SMSC 245 may store and/or output an indication that the message was discarded. For instance, SMSC 245 may output a notification to a user device, from which the message was received (at block 1105), indicating that the message was not forwarded. The user device may, in some implementations, display a notification that the message was not forwarded. Examples of user interfaces, via which user device 205 may display such a notification, are described above with respect to FIGS. 5 and 6.

Figure 11B:
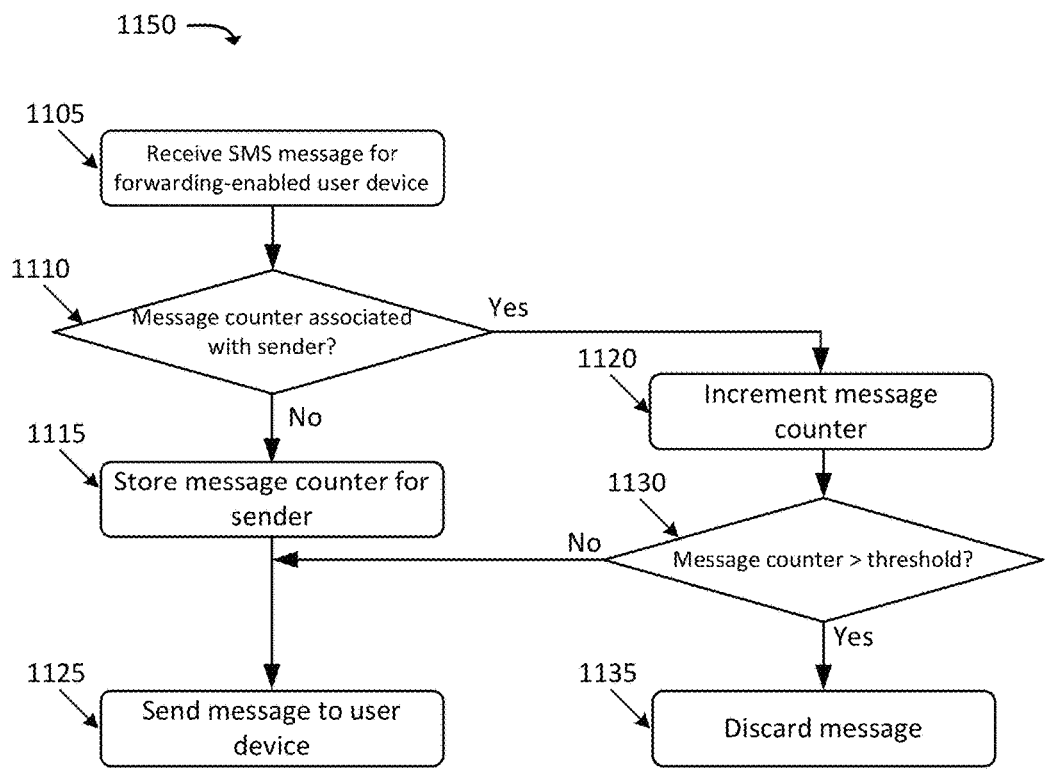

FIG. 11B illustrates another example process 1150 for preventing message feedback based on a volume of messages received. In some implementations, process 1150 may be similar to process 1100, except that the message counter may be incremented (at block 1120) when the message counter for the sender has been previously stored (block 1110—YES).

Figure 12A:
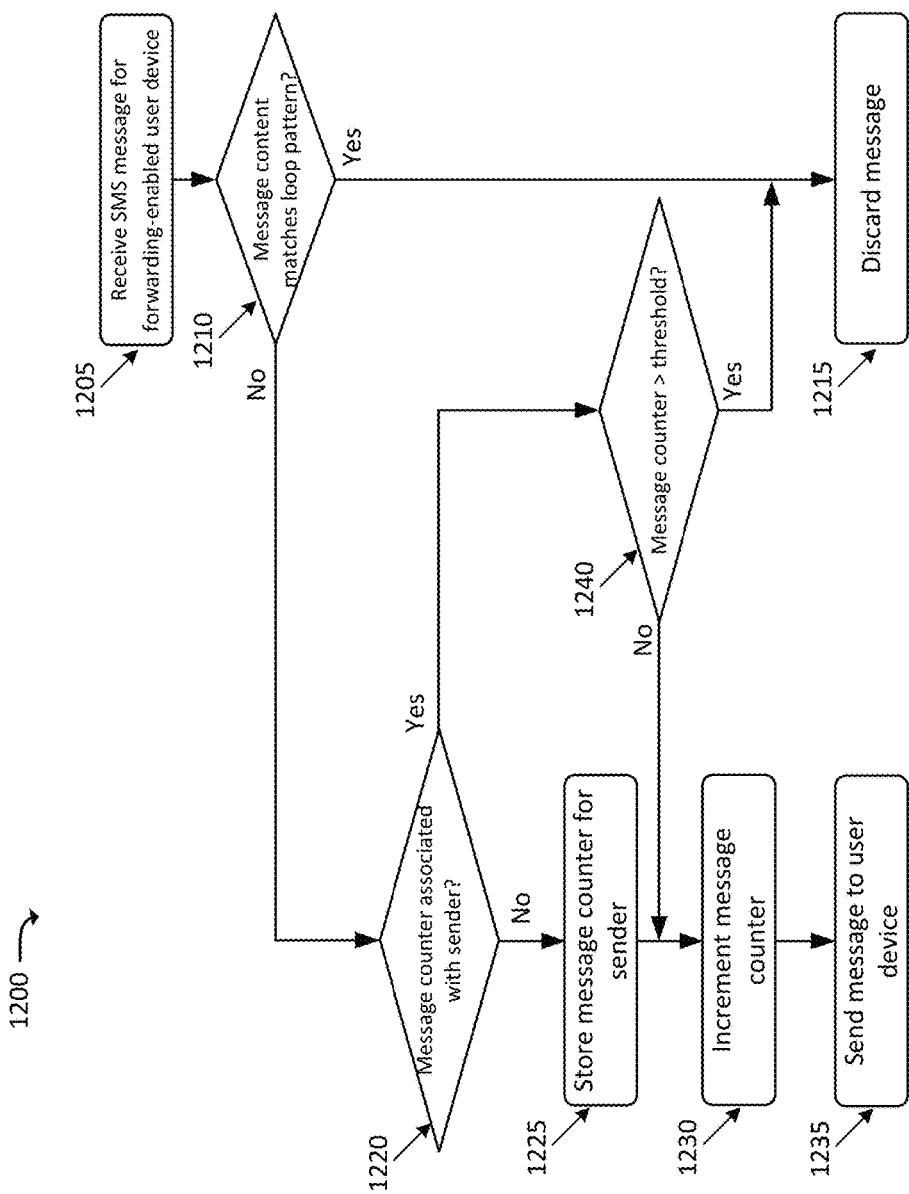
FIGS. 12A and 12B illustrate an example processes for preventing message feedback based on multiple techniques.

FIG. 12A illustrates an example process 1200 for preventing message feedback based on multiple techniques. For example, process 1200 illustrates that, in some implementations, the techniques described above with respect to processes 1000 and 1100A may be used in combination. In one example implementation, process 1200 may be performed by SMSC 245. In other implementations, some or all of process 1200 may be performed by one or more other devices in lieu of, or in conjunction with, SMSC 245

Process 1200 may include receiving an SMS message for a forwarding-enabled user device (block 1205). Process 1200 may further include determining whether the content of the message matches a loop pattern (block 1210). If the content of the message matches the loop pattern (block 1205—YES), the process 1200 may include discarding the message (block 1215).

If, on the other hand, the content of the message does not match the loop pattern (block 1205—NO), then process 1200 may include determining whether a message counter has been previously associated with the sender (block 1220). If a message counter has not been previously associated with the sender (block 1220—NO), then process 1200 may include storing a message counter for the sender (block 1225). Process 1200 may further include incrementing the message counter (block 1230), and sending the message to the user device (block 1235).

If a message counter has been previously associated with the sender (block 1220—YES), then process 1200 may include determining whether the message counter exceeds a threshold (block 1240). If the message counter does not exceed the threshold, then process 1200 may include incrementing the message counter (block 1230), and sending the message to the user device (block 1235). If the message counter exceeds the threshold, then process 1200 may include discarding the message (block 1215).

Figure 12B:
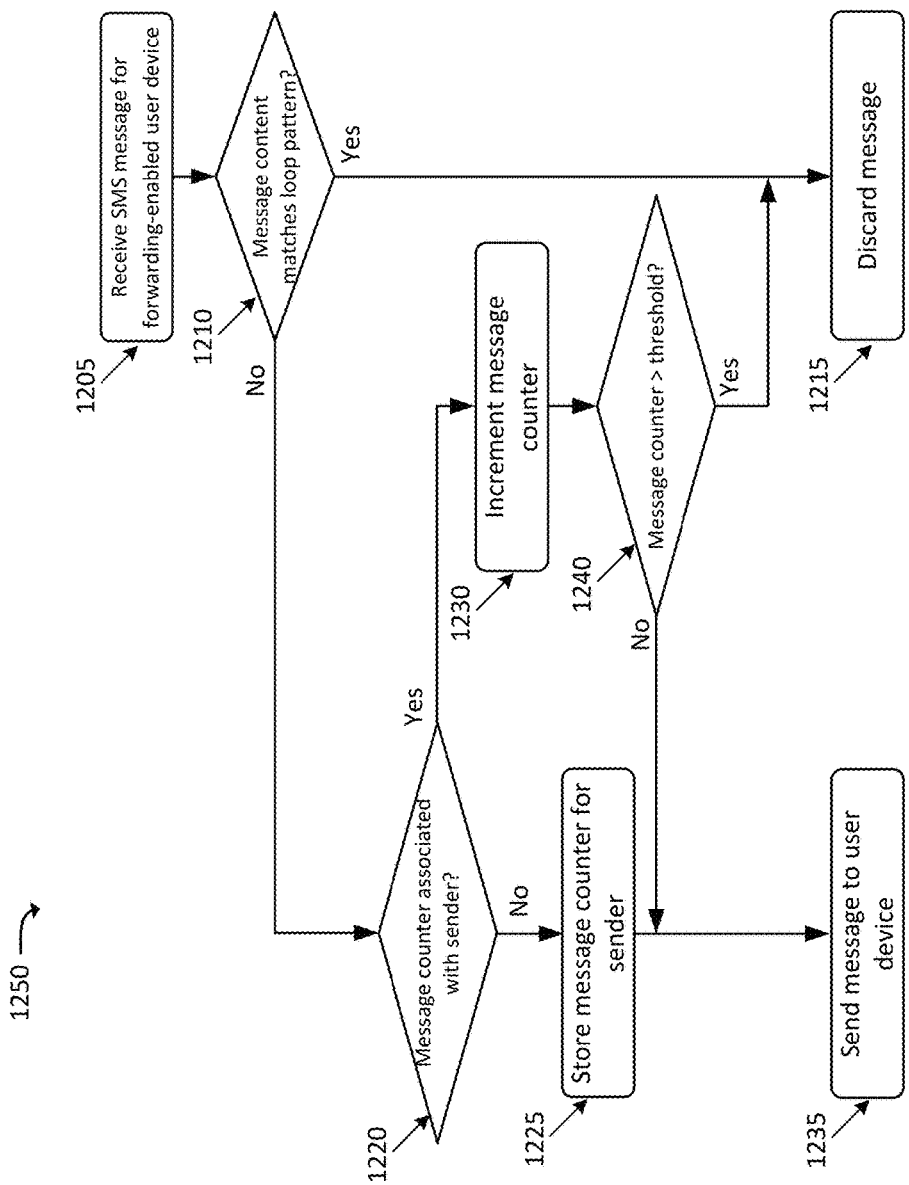

FIG. 12B illustrates another example process 1250 for preventing message feedback based on multiple techniques. In some implementations, process 1250 may be similar to process 1200, except that the message counter may be incremented (at block 12320) when the message counter for the sender has been previously stored (block 1220—YES).

While FIGS. 12A and 12B are described above as examples of using multiple techniques to prevent message looping, in practice, additional, different, and/or differently arranged techniques may be used in combination to prevent message looping. For instance, in some implementations, processes 400 and 1000 may be used in combination, processes 400 and 1100 may be used in combination, processes 400 and 1150 may be used in combination, and so on.

While processes 400, 1000, 1100, 1150, 1200, and 1250 are described in the context of SMS messages, in practice, similar techniques may be used for other types of messages or communications. For example, one or more of these processes may be used when preventing message loops in e-mail messages, multimedia messaging service ("MMS") messages, instant message (or "chat") messages (such as rich communication services ("RCS") messages), and/or other types of messages. In some such implementations, one or more of these processes may each be performed by one or more server devices that process (e.g., send, receive, store, and/or forward) the respective messages. For instance, an e-mail server (such as a post office protocol ("POP") server, a simple mail transfer protocol ("SMTP") server, or another server) may perform one or more of these processes, either in part or in their entirety, when determining whether to forward e-mail messages.

Additionally, in some implementations, based on detecting message looping for a particular user device 205, forwarding may be disabled for the particular user device 205. For instance, if a particular SMSC 245 detects that excessive message looping (e.g., at least a particular quantity of discarded messages over a particular quantity of time)

occurs with respect to the particular user device 205, SMSC 245 may store and/or output (e.g., to another device) an indication that excessive message looping has occurred. Additionally, or alternatively, SMSC 245 may store and/or output an indication each time message looping occurs. Based on these indications, SMSC 245 and/or another device may de-provision (e.g., disable) message forwarding for the particular user device 245. In some implementations, SMSC 245 and/or another device may notify (e.g., via an SMS message, an email, a letter, a telephone call, etc.) a user associated with user device 205 that the de-provisioning has occurred.

Figure 13:
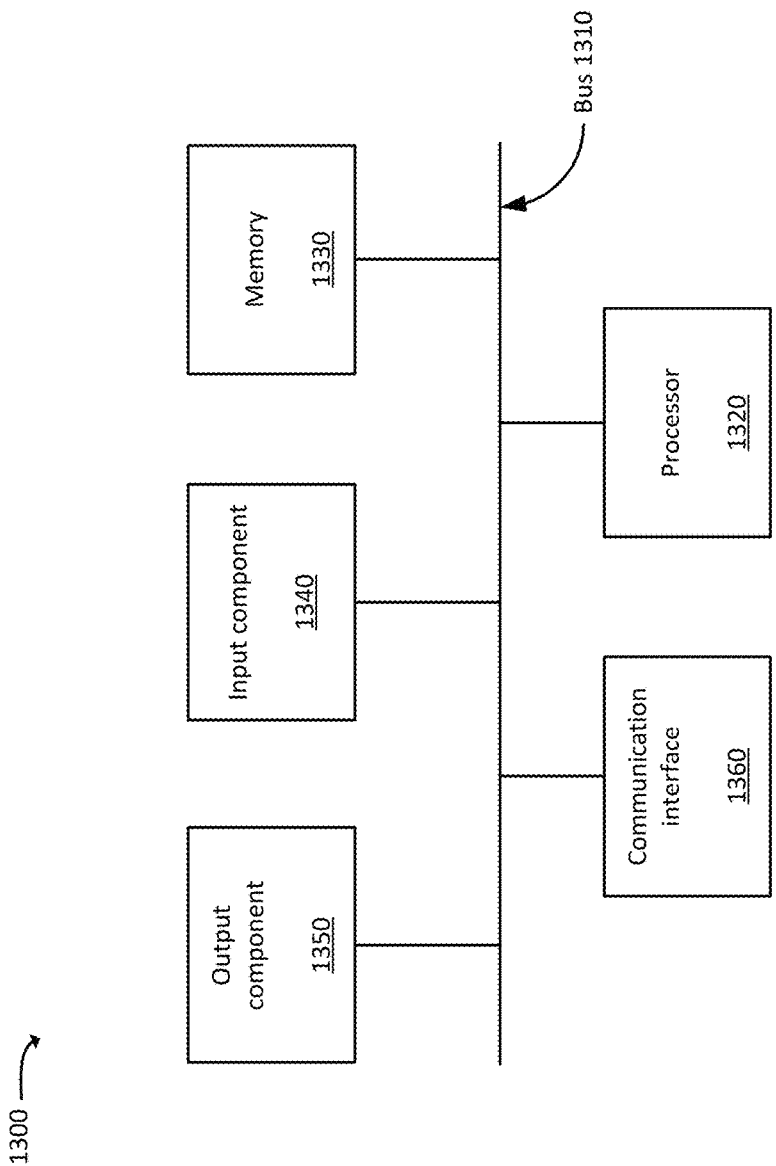
FIG. 13 illustrates example components of one or more devices shown in FIGS. 1, 2, and 7-9.

FIG. 13 is a diagram of example components of device 1300. One or more of the devices illustrated in FIGS. 1, 2, and 7-9 may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4 and 10-12, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a server device and from a user device, a message that was previously received by the user device,
      wherein the message is received from the user device based on a message forwarding service whereby messages received by the user device are automatically forwarded to another user device;
   determining, by the server device, whether the message includes a loop indicator parameter that indicates a maximum quantity of times that the message can be forwarded;
   when the message does not include the loop indicator parameter:
      determining whether content of the message includes at least a threshold quantity of instances of a pre-defined set of characters, wherein each instance of the pre-defined set of characters indicates that the message has been forwarded once, and wherein the quantity of instances of the pre-defined set of characters corresponds to a quantity of times that the message has been forwarded;
      when the quantity of instances of the pre-defined set of characters exceeds the threshold quantity, discarding the message;
      when the quantity of instances of the pre-defined set of characters does not exceed the threshold quantity:
         adding, by the server device, the loop indicator parameter to the message to generate a first modified message, wherein the loop indicator parameter indicates the quantity of times the message has been forwarded, and outputting, by the server device, the first modified message toward an intended recipient of the message, the intended recipient being the another user device;

when the message includes the loop indicator parameter:

determining, based on the loop indicator parameter, based on whether the content of the message includes at least the threshold quantity of instances of the pre-defined set of characters, and by the server device, whether the message should be forwarded, wherein determining whether the message should be forwarded includes:

determining whether a value of the loop indicator parameter exceeds a threshold value; and determining whether the quantity of instances of the pre-defined set of characters exceeds the threshold quantity;

when the determining whether the message should be forwarded indicates that the message should not be forwarded:

discarding, by the server device, the message, and notifying, by the server device, the user device from which the message was received that the message was not forwarded to the intended recipient of the message, wherein notifying the user device, that the message was not forwarded, causes the user device to present a graphical user messaging interface that simultaneously displays:

the message that was not forwarded, a visual indication that the message was not forwarded, and at least one or more other messages that were forwarded to the other user device in accordance with the messaging service; and when the determining whether the message should be forwarded indicates that the message should be forwarded:

modifying, by the server device, the value of the loop indicator parameter value to generate a second modified message, the second modified message being based on the message and the modified loop parameter value, and outputting, by the server device, the second modified message toward the intended recipient of the message.

2. The method of claim 1, wherein the message is a short message service ("SMS") message.

3. The method of claim 1, further including:

determining, based on determining that the message does not include the loop indicator parameter, whether the message is associated with message forwarding, wherein adding the loop indicator parameter to the message is performed based on determining that the message does not include the loop indicator parameter.

4. The method of claim 1, further comprising:

storing information regarding whether to forward messages received by the user device, wherein determining whether the message is associated with message forwarding comprises:

comparing an identifier, associated with a sender of the message, to the information regarding whether to forward messages received by the user device.

5. The method of claim 1, wherein the server device comprises a short message service center ("SMSC").

6. The method of claim 5, wherein the SMSC is a home SMSC associated with the user device.

7. The method of claim 1, wherein the threshold value is 0, wherein modifying the value of the loop indicator parameter includes decrementing the value of the loop indicator parameter, and wherein the modified value is 1 less than the value of the loop indicator parameter.

8. The method of claim 1, further comprising:

determining a quantity of messages, outputted from the user device over a particular period of time; and comparing the quantity of messages, outputted from the user device over the particular period of time, to a threshold quantity of messages, and wherein determining whether the message should be forwarded is further based on the comparing of the quantity of messages, outputted from the user device over the particular period of time, to the threshold quantity of messages.

9. The method of claim 8, wherein when the quantity of messages exceeds the threshold quantity of messages, the determination that the message should not be forwarded is further based on determining that the quantity of messages exceeds the threshold quantity of messages.

10. The method of claim 8, wherein when the quantity of messages does not exceed the threshold quantity of messages, the determination that the message should be forwarded is further based on determining that the quantity of messages does not exceed the threshold quantity of messages.

11. The method of claim 1, wherein determining whether the content of the message includes the pre-defined set of characters includes performing a regular expression analysis on a subject line of the message.

12. A system, comprising:

a non-transitory memory device storing processor-executable instructions; and one or more processors configured to execute the processor-executable instructions, wherein executing the processor-executable instructions causes the one or more processors to:

identify a message received from a user device, wherein the message was previously received by the user device and automatically forwarded to another user device;

determine whether the message includes a loop indicator parameter that indicates a maximum quantity of times that the message can be forwarded;

when the message does not include the loop indicator parameter:

determine whether content of the message includes at least a threshold quantity of instances of a pre-defined set of characters, wherein each instance of the pre-defined set of characters indicates that the message has been forwarded once, and wherein the quantity of instances of the pre-defined set of characters corresponds to a quantity of times that the message has been forwarded;

when the quantity of instances of the pre-defined set of characters exceeds the threshold quantity, discarding the message;

when the quantity of instances of the pre-defined set of characters does not exceed the threshold quantity:

add the loop indicator parameter to the message to generate a first modified message, wherein the loop indicator parameter indicates the quantity of times the message has been forwarded, and output the first modified message toward an intended recipient of the message, the intended recipient being the another user device;

when the message includes the loop indicator parameter:

determine, based on the loop indicator parameter and based on whether the content of the message includes at least the threshold quantity of instances of the pre-defined set of characters, whether the message should be forwarded, wherein determining whether the message should be forwarded includes:

determining whether the value of the loop indicator parameter exceeds a threshold value; and determining whether the quantity of instances of the pre-defined set of characters exceeds the threshold quantity;

when determining that the message should not be forwarded:

discard the message, and notify the user device that the message was not forwarded to the intended recipient of the message, wherein notifying the user device, that the message was not forwarded, causes the user device to present a graphical user messaging interface that simultaneously displays:

the message that was not forwarded, a visual indication that the message was not forwarded, and at least one or more other messages that were forwarded to the other user device in accordance with the messaging service; and when determining that the message should be forwarded:

modify the value of the loop indicator parameter value to generate a second modified message, the second modified message being based on the message and the modified loop parameter value, and output the second modified message toward the intended recipient of the message.

13. A non-transitory computer-readable medium storing processor-executable instructions, wherein when executed by one or more processors, the processor-executable instructions cause the one or more processors to:

identify a message received from a user device, wherein the message was previously received by the user device and automatically forwarded based on a service whereby messages received by the user device are automatically forwarded to another user device;

determine whether the message includes a loop indicator parameter that indicates a maximum quantity of times that the message can be forwarded;

when the message does not include the loop indicator parameter:

determine whether content of the message includes at least a threshold quantity of instances of a pre-defined set of characters, wherein each instance of the pre-defined set of characters indicates that the message has been forwarded once, and wherein the quantity of instances of the pre-defined set of characters corresponds to a quantity of times that the message has been forwarded;

when the quantity of instances of the pre-defined set of characters exceeds the threshold quantity, discarding the message;

when the quantity of instances of the pre-defined set of characters does not exceed the threshold quantity:

add the loop indicator parameter to the message to generate a first modified message, wherein the loop indicator parameter indicates the quantity of times the message has been forwarded, and output the first modified message toward an intended recipient of the message, the intended recipient being the another user device;

when the message includes the loop indicator parameter:

determine, based on the loop indicator parameter and based on whether the content of the message includes at least the threshold quantity of instances of the pre-defined set of characters, whether the message should be forwarded, wherein determining whether the message should be forwarded includes:

determining whether the value of the loop indicator parameter exceeds a threshold value; and determining whether the quantity of instances of the pre-defined set of characters exceeds the threshold quantity;

when determining that the message should not be forwarded:

discard the message, and notify the user device that the message was not forwarded to the intended recipient of the message, wherein notifying the user device, that the message was not forwarded, causes the user device to present a graphical user messaging interface that simultaneously displays:

the message that was not forwarded, a visual indication that the message was not forwarded, and at least one or more other messages that were forwarded to the other user device in accordance with the messaging service; and when determining that the message should be forwarded:

modify the value of the loop indicator parameter value to generate a second modified message, the second modified message being based on the message and the modified loop parameter value, and output the second modified message toward the intended recipient of the message.

14. The non-transitory computer-readable medium of claim 13, wherein the processor-executable instructions further cause the one or more processors to:

determine a quantity of messages, outputted from the user device over a particular period of time; and compare the quantity of messages, outputted from the user device over the particular period of time, to a threshold quantity of messages, wherein determining whether the message should be forwarded is further based on the comparing of the quantity of messages, outputted from the user device over the particular period of time, to the threshold quantity of messages.

15. The method of claim 1, wherein the message received from the user device includes text, wherein the first modified message includes the same text as the text included in the message received from the user device, and wherein the second modified message includes the same text as the text included in the message received from the user device.

16. The method of claim 1, wherein the pre-defined set of characters includes a pre-defined sequence of the characters.

17. The method of claim 16, wherein the pre-defined set of characters includes the letters "FW", with the "F" appearing before the "W" and with no intervening characters in between the "F" and the "W".

18. The method of claim 11, wherein the regular expression analysis is used to determine whether the content of the message includes the pre-defined set of characters, wherein a wildcard that denotes any character is used, in the regular expression analysis, in between each instance of the pre-defined set of characters.

* * * * *